United States Patent
Koyama et al.

(10) Patent No.: US 12,247,928 B2
(45) Date of Patent: Mar. 11, 2025

(54) INSPECTION DEVICE AND INSPECTION METHOD FOR SHEET LAYER

(71) Applicant: Kawasaki Jukogyo Kabushiki Kaisha, Kobe (JP)

(72) Inventors: Masataka Koyama, Kobe (JP); Tomohiro Kinoshita, Kobe (JP); Hiroharu Suzuki, Kobe (JP); Motohiro Nakagami, Kobe (JP); Yuki Hanawa, Kobe (JP); Shogo Kojima, Kobe (JP); Yusaku Ishida, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 220 days.

(21) Appl. No.: 17/789,244

(22) PCT Filed: Dec. 25, 2020

(86) PCT No.: PCT/JP2020/048919
§ 371 (c)(1),
(2) Date: Jun. 27, 2022

(87) PCT Pub. No.: WO2021/132629
PCT Pub. Date: Jul. 1, 2021

(65) Prior Publication Data
US 2023/0035817 A1    Feb. 2, 2023

(30) Foreign Application Priority Data

Dec. 27, 2019    (JP) .................. 2019-237749

(51) Int. Cl.
*G01N 21/95*    (2006.01)
*G01B 11/25*    (2006.01)

(52) U.S. Cl.
CPC ..... *G01N 21/9515* (2013.01); *G01B 11/2518* (2013.01); *G01N 2021/9518* (2013.01)

(58) Field of Classification Search
CPC ....... G01N 21/9515; G01N 2021/9518; G01N 2021/8909; G01N 21/8901; G01N 21/95; G01B 11/2518; G01B 11/005
See application file for complete search history.

(56) References Cited

U.S. PATENT DOCUMENTS 6,842,240 B2 *   1/2005   Ueta .................... G01N 21/958
                                           356/239.2
7,598,844 B2 *   10/2009   Corcoran ............... G01D 4/004
                                           340/12.32

(Continued)

FOREIGN PATENT DOCUMENTS

JP    11-138388 A    5/1999
JP    2005-308613 A    11/2005

(Continued)

*Primary Examiner* — Hung V Nguyen
*Assistant Examiner* — Hung Henry Nguyen
(74) *Attorney, Agent, or Firm* — XSENSUS LLP

(57) ABSTRACT

An inspection device includes a scanning device, a first recognition unit, and a second recognition unit. The scanning device includes a laser sensor that emits laser slit light for measuring a two-dimensional shape, and a movement mechanism that moves the laser sensor in a predetermined direction. The first recognition unit obtains three-dimensional shape data of an inspection object and a workpiece by associating a plurality of two-dimensional shape data obtained by the laser sensor with position data of the laser sensor at the time of measuring the two-dimensional shape. The second recognition unit derives a three-dimensional shape of the workpiece by obtaining a difference between first three-dimensional shape data indicating a three-dimensional shape before the workpiece is laminated on the mold and second three-dimensional shape data indicating a three-dimensional shape after the workpiece is laminated on the mold.

9 Claims, 11 Drawing Sheets

(56) References Cited

U.S. PATENT DOCUMENTS

| | | | | |
|---|---|---|---|---|
| 8,497,476 | B2* | 7/2013 | Hatakeyama | G01N 23/2251 |
| | | | | 250/311 |
| 8,793,089 | B2* | 7/2014 | Sonda | G01B 11/2509 |
| | | | | 356/601 |
| 2012/0098961 | A1* | 4/2012 | Handa | G01B 11/2518 |
| | | | | 356/601 |
| 2018/0031491 | A1 | 2/2018 | Thompson et al. | |
| 2023/0099779 | A1* | 3/2023 | Redgewell | G01S 17/66 |
| | | | | 356/614 |

FOREIGN PATENT DOCUMENTS

| | | |
|---|---|---|
| JP | 2008-229444 A | 10/2008 |
| JP | 2018-31775 A | 3/2018 |
| JP | 2019-94546 A | 6/2019 |
| JP | 2019-151931 A | 9/2019 |
| WO | 2018/185891 A1 | 10/2018 |

* cited by examiner

FIG.6A
<FIRST LAYER>

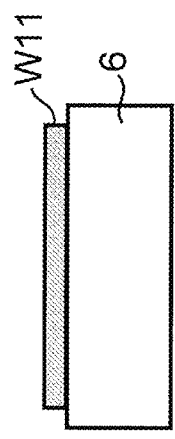
SHAPE DATA(1)

D11(x=p2)

BEFORE LAMINATION,
BASE SUBSTRATE=MOLD

⇨

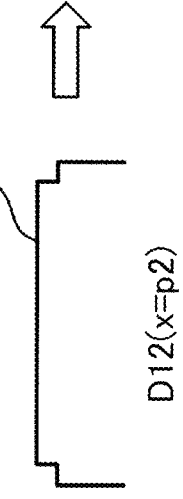
SHAPE DATA(2) DA

D12(x=p2)

AFTER LAMINATION
OF FIRST LAYER

⇨

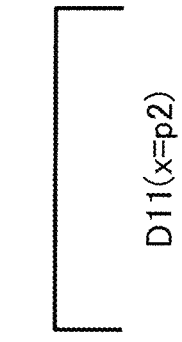
EVALUATION DATA
(2)−(1)

W11
6

DIFFERENCE BETWEEN BEFORE
AND AFTER LAMINATION

FIG.6B
<SECOND LAYER>

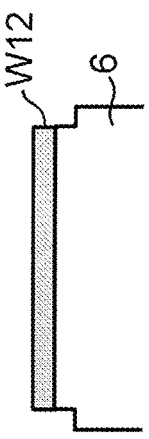
SHAPE DATA(2)

D21(x=p2)

BEFORE LAMINATION,
BASE SUBSTRATE=MOLD+FIRST LAYER

⇨

SHAPE DATA(3) DB

D22(x=p2)

AFTER LAMINATION
OF SECOND LAYER

⇨

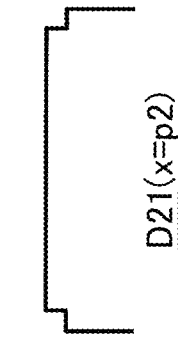
EVALUATION DATA
(3)−(2)

W12
6

DIFFERENCE BETWEEN BEFORE
AND AFTER LAMINATION

FIG.8
(A) TAPE MISSING, GAP
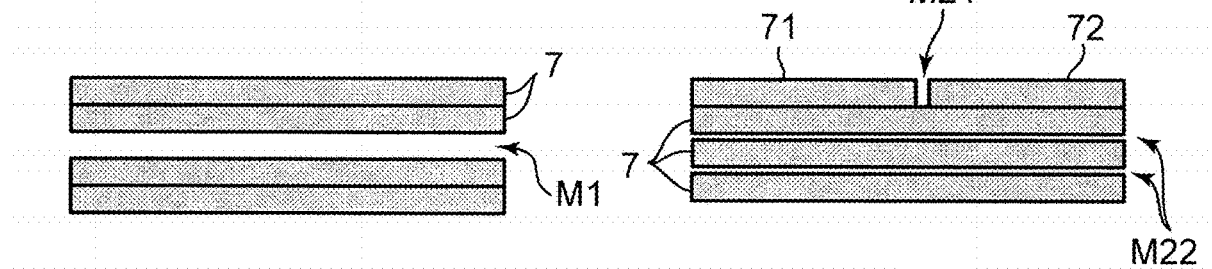
(B) TAPE OVERLAPPING
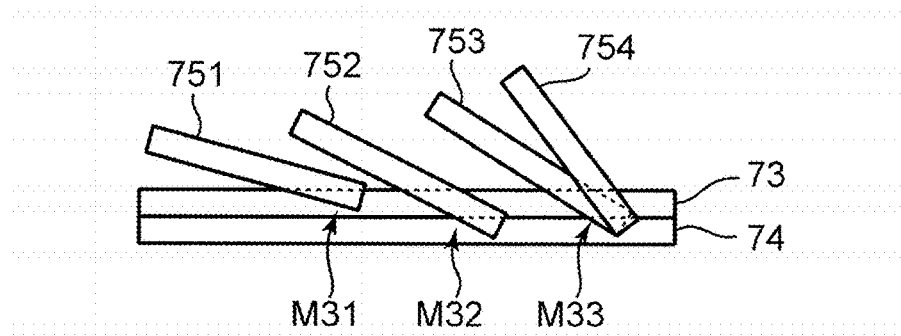
(C) TAPE PEELING, TAPE LOOSENING
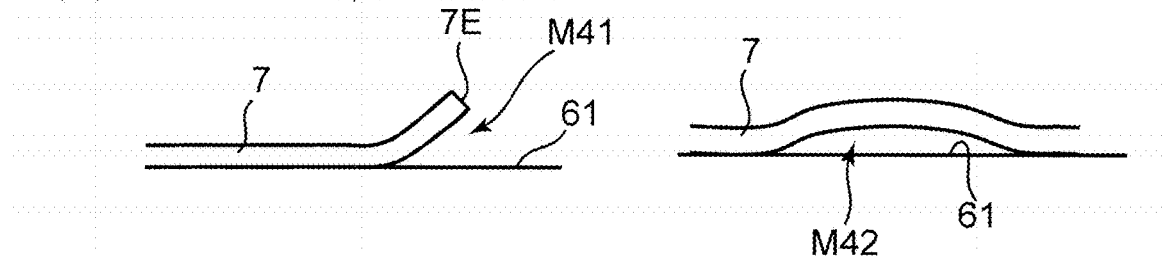
(D) TAPE TWISTING
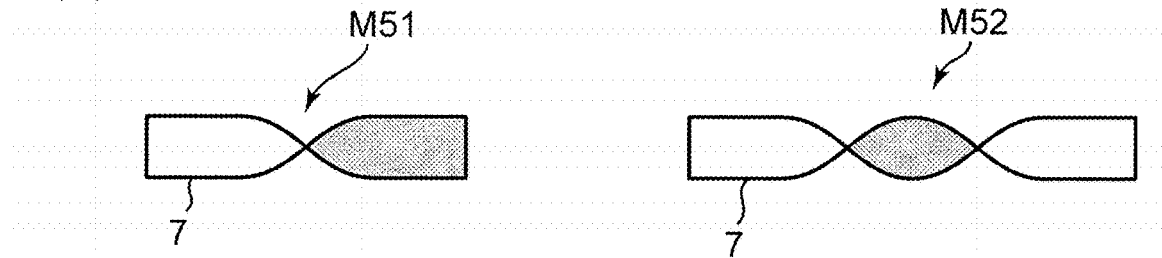
(E) TAPE FOLDING
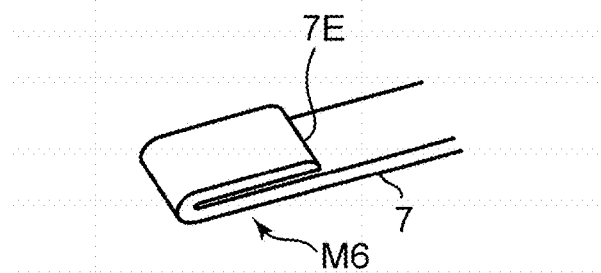

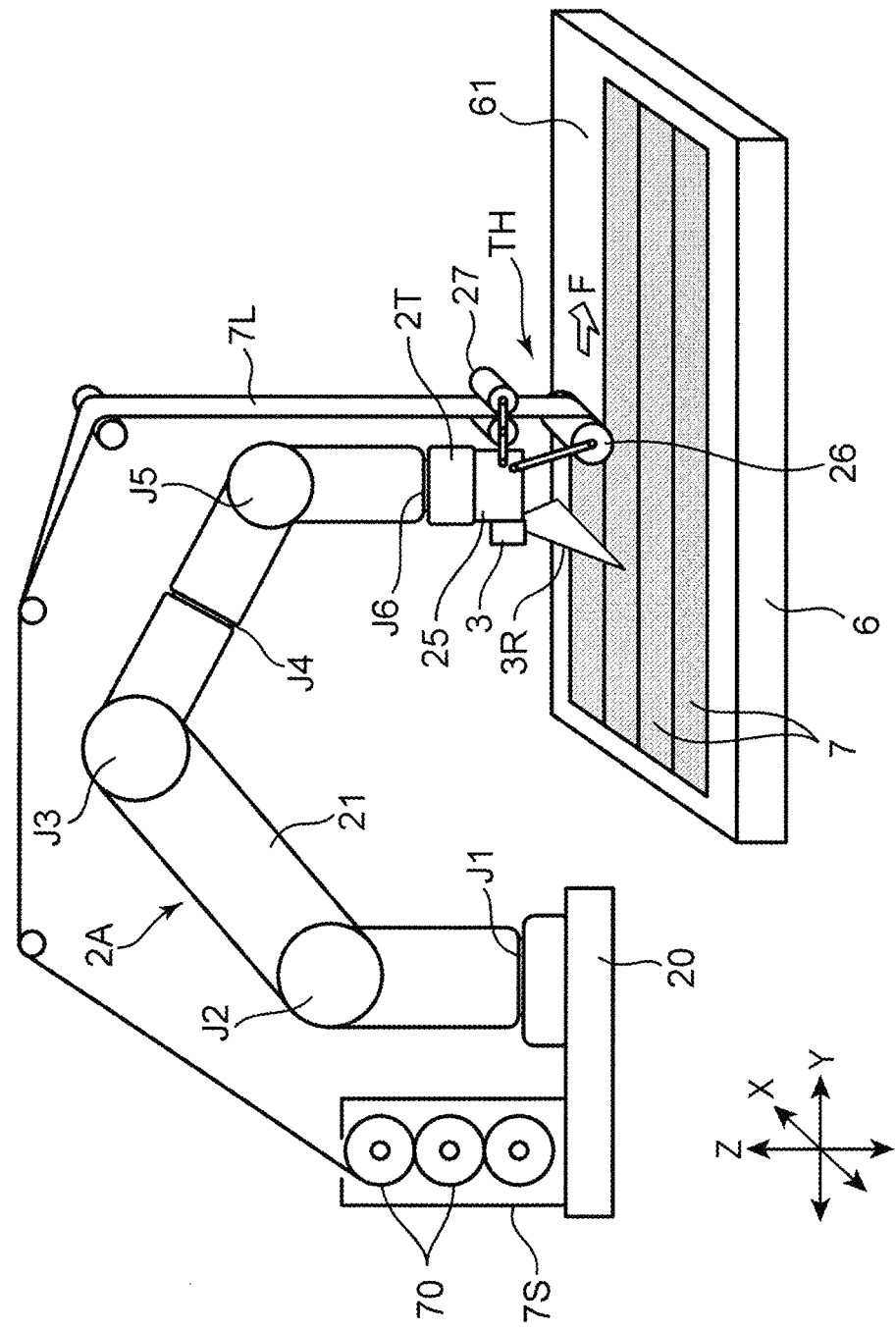

INSPECTION DEVICE AND INSPECTION METHOD FOR SHEET LAYER

CROSS-REFERENCE TO RELATED APPLICATIONS

The present application is based on PCT filing PCT/JP2020/048919, filed Dec. 25, 2020, which claims priority to JP 2019-237749, filed Dec. 27, 2019, the entire contents of each are incorporated herein by reference.

TECHNICAL FIELD

The present invention relates to an inspection device and an inspection method for a sheet layer laminated on a base substrate such as a mold.

BACKGROUND ART

For example, there is a known method of laminating a composite material sheet such as a metal sheet, a resin sheet, or a fiber-reinforced resin sheet, and subjecting the obtained laminated body to heating and pressurizing processing or the like to obtain a molded component (or a complicated-shaped component). The laminated body is manufactured by sequentially laminating sheet layers to a required thickness, for example, by attaching sheet pieces having a predetermined shape onto a mold having a required outer shape to form one first sheet layer, and further attaching sheet pieces onto the first sheet layer to form a second sheet layer.

In manufacturing such a molded component (or a complicated-shaped component), if the sheet layers are not laminated as specified, quality of the component may deteriorate. It is therefore necessary to inspect whether a laminated state of the sheet layer is good or not. Conventionally, this inspection is performed only by visual observation by an operator. In addition, Patent Literature 1 proposes an inspection system that measures a surface shape of a laminated body of sheet pieces with a three-dimensional shape sensor using an infrared camera to evaluate whether or not a foreign matter is mixed into the laminated body and evaluate a laminated state of a sheet layer.

However, if inspection of a laminated state of a sheet layer depends on visual observation by an operator, not only labor saving cannot be achieved, but also determination errors and overlooking inevitably occur. This causes a problem in terms of quality stabilization of a molded component (or a complicated-shaped component). In addition, in such a case of introducing a device that measures a surface shape of a laminated body as the inspection system recited in Patent Literature 1, an expensive sensor system that measures a three-dimensional shape of the laminated body with high accuracy is required, resulting in causing a problem in cost.

CITATION LIST

Patent Literature

Patent Literature 1: JP 2018-031775 A

SUMMARY OF INVENTION

An object of the present invention is to provide an inspection device and an inspection method for a sheet layer which enable cost reduction while automating inspection of a laminated state of a sheet layer.

An inspection device for a sheet layer according to one aspect of the present invention is an inspection device that inspects a sheet layer laminated on a base substrate, the inspection device including: a scanning device including a laser sensor that measures a two-dimensional shape of an inspection object using laser slit light, and a movement mechanism that moves the laser sensor in a predetermined direction; a first recognition unit that obtains three-dimensional shape data of an inspection object by associating a plurality of two-dimensional shape data obtained by the laser sensor with position data of the laser sensor at the time of measuring the two-dimensional shape; and a second recognition unit that derives a three-dimensional shape of a sheet layer by obtaining a difference between first three-dimensional shape data indicating a three-dimensional shape of a first inspection object before the sheet layer is laminated on the base substrate and second three-dimensional shape data indicating a three-dimensional shape of a second inspection object after the sheet layer is laminated on the base substrate.

An inspection method for a sheet layer according to another aspect of the present invention is an inspection method for inspecting a sheet layer laminated on a base substrate, the inspection method including: moving a laser sensor that measures a two-dimensional shape of an inspection object using laser slit light so as to scan the inspection object with the laser slit light; obtaining three-dimensional shape data of an inspection object by associating a plurality of two-dimensional shape data obtained by the laser sensor with position data of the laser sensor at the time of measuring the two-dimensional shape; and deriving a three-dimensional shape of a sheet layer by obtaining a difference between first three-dimensional shape data indicating a three-dimensional shape of a first inspection object before the sheet layer is laminated on the base substrate and second three-dimensional shape data indicating a three-dimensional shape of a second inspection object after the sheet layer is formed on the base substrate.

BRIEF DESCRIPTION OF DRAWINGS

FIG. 6A is a diagram illustrating an example of obtaining a shape of a first layer of a sheet by difference data, and FIG. 6B is a diagram illustrating an example of obtaining a shape of a second layer of the sheet layer by difference data.

FIG. 8 is views listing specific examples (A) to (E) of defective taping onto a mold.

FIG. 9 is a schematic view illustrating an example in which a taping head and a laser sensor are mounted on an articulated robot.

DESCRIPTION OF EMBODIMENTS

Overall Configuration of Inspection Device

Figure 1:
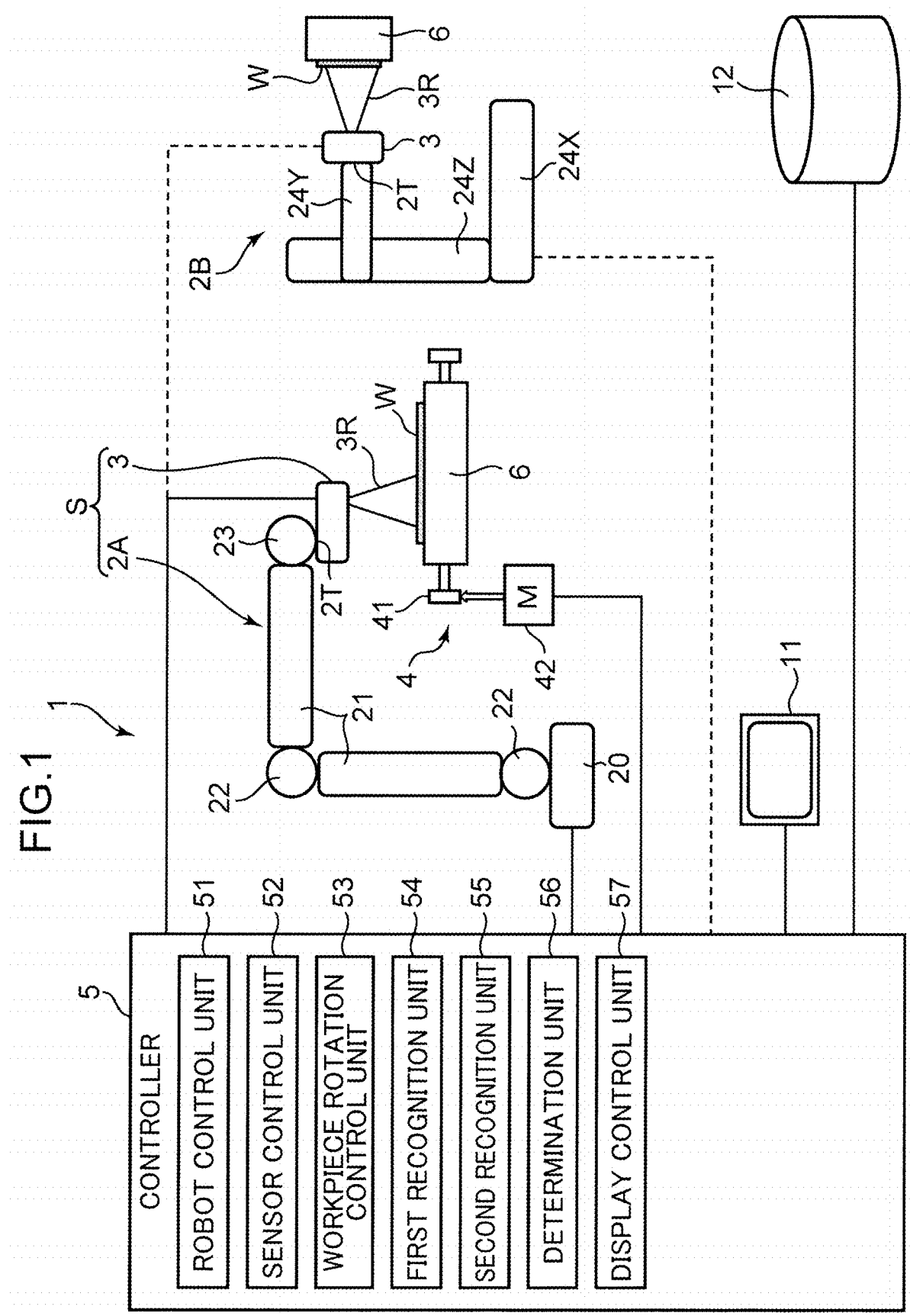
FIG. 1 is a block diagram illustrating an overall configuration of an inspection device for a sheet layer according to an embodiment of the present invention.

In the following, an embodiment of the present invention will be described with reference to the accompanying drawings. FIG. 1 is a block diagram illustrating an overall configuration of an inspection device 1 for a sheet layer according to an embodiment of the present invention. The inspection device 1 includes a scanning device S including an articulated robot 2A (movement mechanism) and a laser sensor 3, a workpiece rotation mechanism 4 (support mechanism), and a controller 5 that controls operations of these components and performs required calculation processing. The inspection device 1 is a device that inspects sheet layers constituting a workpiece W laminated on a mold 6 (laminated mold) as a base substrate.

The scanning device S is a device that optically scans the workpiece W formed on the mold 6 for three-dimensional shape recognition of the workpiece W. The laser sensor 3 measures a two-dimensional shape of an inspection object by a light cutting method using laser slit light 3R. The laser sensor 3 includes a laser light source, an optical component that converts laser light emitted from the laser light source into the laser slit light 3R spreading in a fan shape and irradiates an inspection object with the laser slit light, and a light receiving unit that receives a reflected light of the laser slit light 3R from the inspection object. In the present embodiment, the inspection object is the mold 6 alone or the mold 6 on which the workpiece W made of a laminated body of one or a plurality of sheet layers is formed.

The articulated robot 2A is a movement mechanism that moves the laser sensor 3 in a predetermined scanning direction. The laser sensor 3 measures a two-dimensional shape of an inspection object at a predetermined measurement pitch while being moved by the articulated robot 2A. The articulated robot 2A may have a function other than the movement mechanism for the laser sensor 3. For example, the articulated robot may have a function of forming the workpiece W on the mold 6 (illustrated in FIG. 9) or may be equipped with a camera that captures 2D images of the workpiece W and the mold 6.

The articulated robot 2A includes a base stand 20, a plurality of robot arms 21 erected on the base stand, a plurality of joint shafts 22 connecting the robot arms 21, and a wrist part 23 arranged at a distal end of the robot arm 21. The laser sensor 3 is mounted on a robot distal end 2T which is an arm tip of the articulated robot 2A, and can be freely changed in position. In a case where long distance scanning is required, it is desirable that the base stand 20 is assembled on a stage movable at least in either an X direction or a Y direction to make the articulated robot 2A itself movable. As the articulated robot 2A, for example, a general-purpose industrial robot equipped with six rotation shafts can be used.

The movement mechanism of the laser sensor 3 is not limited to the articulated robot 2A. FIG. 1 also illustrates an orthogonal axis robot 2B as another example of the movement mechanism. The orthogonal axis robot 2B includes an X-axis frame 24X, a Y-axis frame 24Y, and a Z-axis frame 24Z which are three moving shafts orthogonal to each other. The X-axis frame 24X supports the Z-axis frame 24Z so as to be movable in an X-axis direction. The Z-axis frame 24Z supports the Y-axis frame 24Y so as to be movable in a Z-axis direction. The Y-axis frame 24Y moves the robot distal end 2T in the Y direction. The laser sensor 3 is mounted on the robot distal end 2T which is a distal end of the Y-axis frame 24Y. Such orthogonal axis robot 2B may be used instead of the articulated robot 2A. In addition, the laser sensor 3 may be configured to move in a predetermined direction by a movement mechanism other than an industrial robot, for example, by a ball screw mechanism or the like.

The workpiece rotation mechanism 4 is a mechanism for changing a posture of the mold 6 on which the workpiece W is formed. The workpiece rotation mechanism 4 includes a workpiece holding unit 41 and a drive motor 42. The workpiece holding unit 41 includes a rotation shaft that rotatably supports the mold 6 about the shaft, and an input unit for a rotation driving force. The drive motor 42 applies a rotation driving force to the input unit to rotate the mold 6 about the shaft. In a case where it is not necessary to rotate the mold 6, that is, where the workpiece W is formed only on one surface that can be always opposed to the laser sensor 3, the workpiece rotation mechanism 4 can be omitted.

The controller 5 is electrically connected to the scanning device S and the workpiece rotation mechanism 4. A monitor 11 and a data server 12 are connected to the controller 5. The monitor 11 is a display for performing various displays related to the inspection device 1, and displays an inspection result of the workpiece W and the like in the present embodiment. The data server 12 stores various set values and data related to the inspection device 1. For example, in the data server 12, data related to a size of tapes constituting the mold 6 or the workpiece W, shape data set in advance as a design value of the mold 6 on which a sheet layer has been laminated, and the like are stored.

The controller 5 is configured with a microcomputer or the like, and operates to functionally include a robot control unit 51, a sensor control unit 52, a workpiece rotation control unit 53, a first recognition unit 54, a second recognition unit 55, a determination unit 56, and a display control unit 57 as a result of execution of a predetermined program.

The robot control unit 51 moves the laser sensor 3 to a required position by controlling operation of the articulated robot 2A (or the orthogonal axis robot 2B). Specifically, the robot control unit 51 performs control to move the laser sensor 3 from a scan start position to an end position in a predetermined direction and at a predetermined speed. The sensor control unit 52 controls the laser sensor 3 to measure two-dimensional shapes of the mold 6 and the workpiece W. Specifically, the sensor control unit 52 causes the laser sensor 3 to emit the laser light source at each measurement position in the scanning direction, thereby irradiating the mold 6 and the workpiece W with the laser slit light 3R. The workpiece rotation control unit 53 controls the workpiece rotation mechanism 4 to change the posture of the mold 6 to a required rotation posture.

The first recognition unit 54 performs calculation to obtain three-dimensional shape data of the mold 6 and the workpiece W by associating a plurality of pieces of two-dimensional shape data obtained by the laser sensor 3 with position data of the laser sensor 3 at the measurement of the two-dimensional shape. The second recognition unit 55 performs calculation for deriving a three-dimensional shape of the sheet layer by obtaining a difference between three-dimensional shape data before and after lamination of the sheet layer constituting the workpiece W. The operations of the first recognition unit 54 and the second recognition unit 55 will be described in detail later.

The determination unit 56 performs processing of determining whether a sheet layer is normal or not on the basis of a three-dimensional shape of the sheet layer derived by the second recognition unit 55. The display control unit 57 performs control for causing the monitor 11 to display a determination result of the determination unit 56 in a predetermined display form. For example, when a defect is detected in a laminated state of the sheet layer, the display control unit 57 displays the defective part in color or the like to call for the operator's correction.

[Formation of Sheet Layer]

Figure 2A:
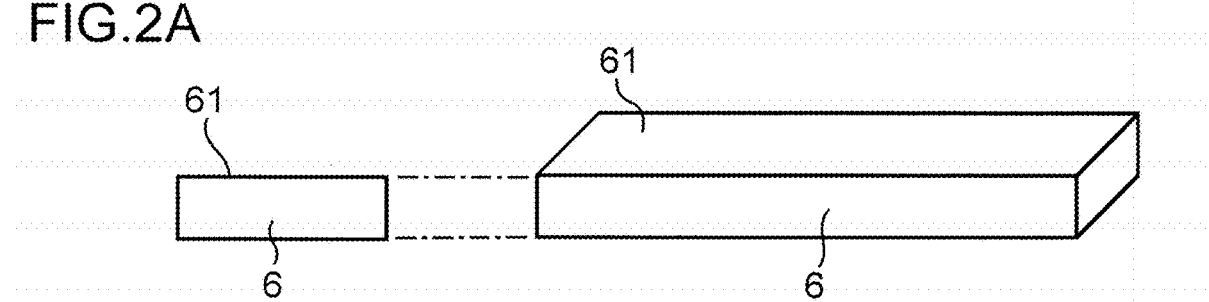
FIGS. 2A to 2D are schematic views showing a mode of lamination of sheet layers.

As described above, in the present embodiment, the workpiece W on the mold 6 is formed by laminating a plurality of sheet layers. FIGS. 2A to 2D are schematic views showing a mode of lamination of sheet layers. FIG. 2A include a side view (left view) of the mold 6 and a perspective view (right view) thereof. Here, for simplification of illustration, a simple mold 6 made of a rectangular parallelepiped long in one direction is illustrated.

The mold 6 includes a surface 61 on which the sheet layer is laminated. The surface 61 is a surface that forms a shape of the workpiece W. For example, when the workpiece W is a simple flat plate-shaped member, the surface 61 is a horizontal plane as illustrated in FIG. 2A. When the workpiece W is a member having a curved surface, the surface 61 is a plane having a planar shape along the intended curved surface. A plurality of sheet layers are sequentially laminated using the mold 6 having such surface 61 as described above as a base substrate.

Figure 2B:
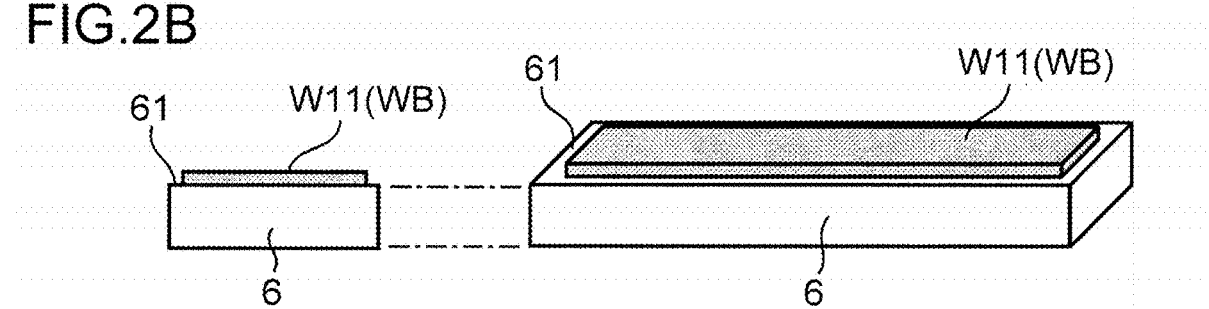
Figure 3:
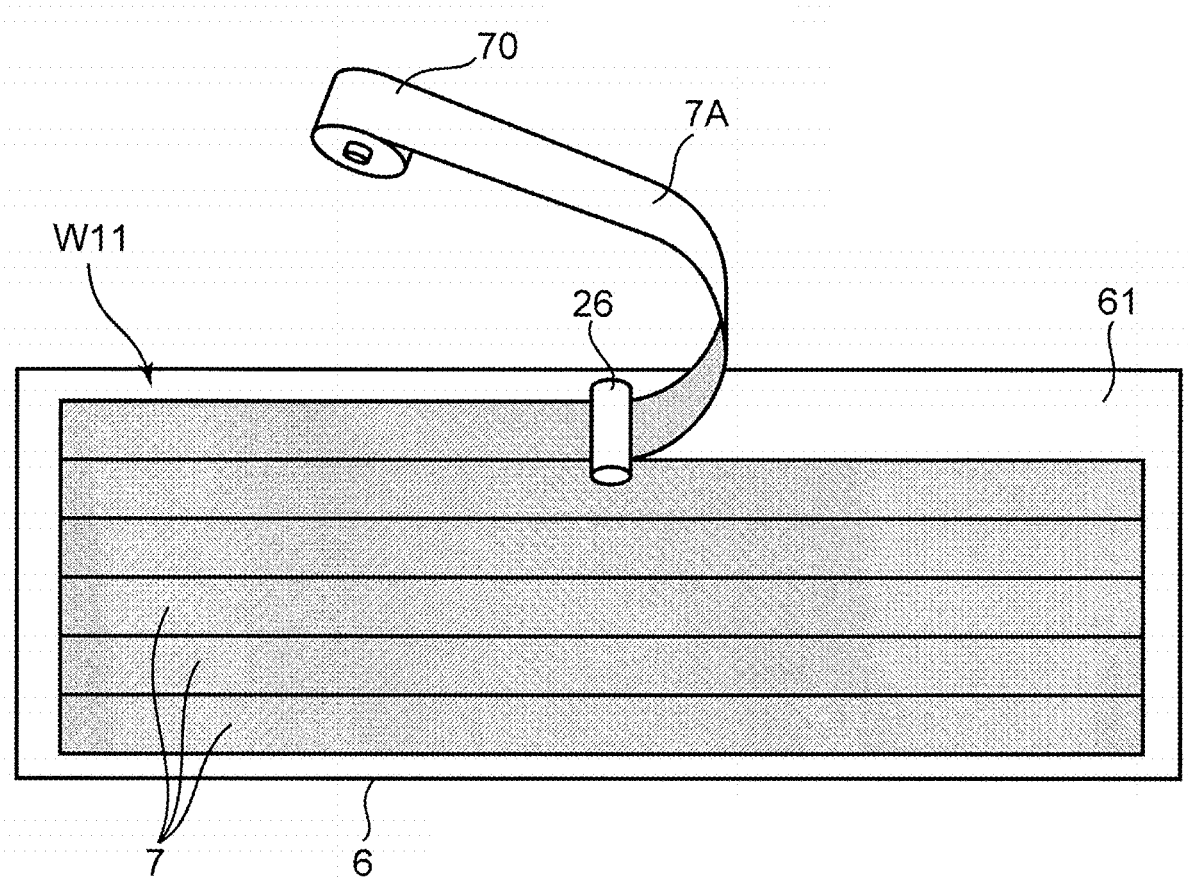
FIG. 3 is a schematic view illustrating a mode of attaching a tape piece to a mold.

FIG. 2B illustrates a state in which a first sheet layer W11 is laminated on the surface 61 of the mold 6. The first sheet layer W11 is formed, for example, by placing or attaching a sheet body processed in advance into a required shape and having a predetermined thickness on or to the surface 61, or by arranging tape-type sheet pieces in parallel (FIG. 3). As the sheet body or the sheet piece, a sheet made of metal, resin, or rubber, a composite sheet of resin and reinforcing fiber such as FRP, or the like can be used. In a subsequent sheet layer, a formed product in which the first sheet layer W11 is formed on the mold 6 serves as a base substrate. In other words, the first sheet layer W11 serves as a basic sheet layer WB on which the subsequent sheet layer is laminated.

Figure 2C:
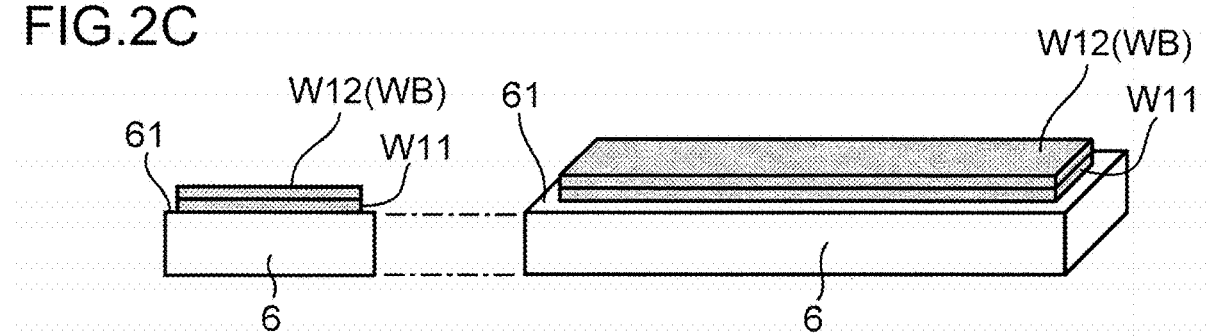
Figure 2D:
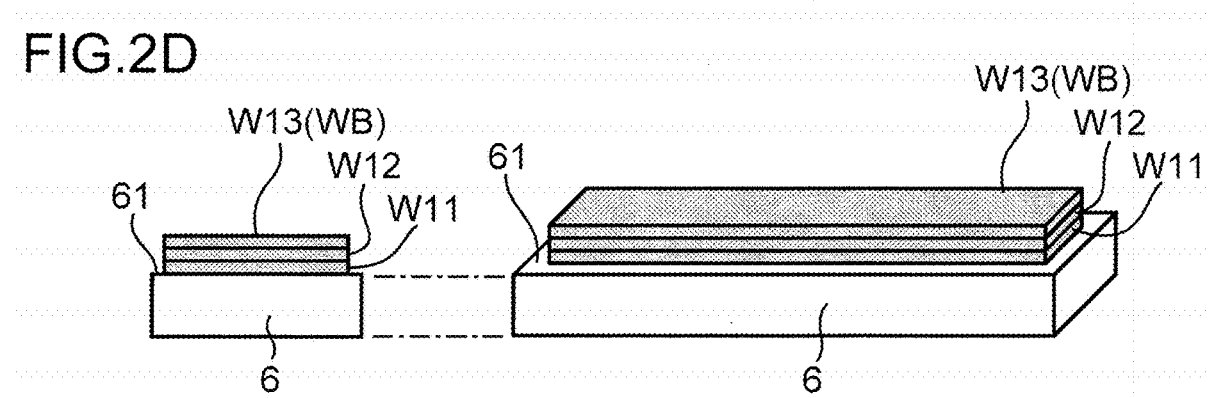

FIG. 2C illustrates a state in which a second sheet layer W12 is laminated on the first sheet layer W11. A mode of formation of the second sheet layer W12 is similar to that of the first sheet layer W11. FIG. 2D illustrates a state in which a third sheet layer W13 is further laminated on the second sheet layer W12. Specifically, the third sheet layer W13 is laminated with the second sheet layer W12 as the basic sheet layer WB. In lamination of the subsequent sheet layer, the third sheet layer W13 serves as the basic sheet layer WB. Hereinafter, similar lamination work of sheet layers is performed as many times as the required number of layers.

When the work of laminating the sheet layers is completed and the workpiece W having a predetermined shape is formed on the mold 6, the formed product is subjected to subsequent processing. The subsequent stage processing is, for example, vacuum processing and heating processing. Specifically, the mold 6 on which the workpiece W is formed is covered with a sealed bag and vacuumed to remove air and volatiles between the sheet layers. Next, heating processing is performed under a predetermined pressure to integrate the plurality of sheet layers constituting the workpiece W. Then, the workpiece W is released from the mold 6 to obtain a required molded component (or a complicated-shaped component).

FIG. 3 is a view schematically illustrating a formation example of one sheet layer (e.g., the first sheet layer W11). Here, an example is illustrated in which a sheet layer is formed by attaching a plurality of tape pieces 7 (sheet pieces) cut out from a tape roll 70. The tape roll 70 is, for example, a roll around which a tape having a predetermined tape width is wound. A tape 7A fed out from the tape roll 70 is pressed against the surface 61 of the mold 6 by an attaching roller 26 provided in an attaching head, and is attached to the surface 61.

When the tape 7A is attached from one end to the other end of the surface 61, the tape 7A is cut by a cutter (not illustrated). By this operation, the tape piece 7 for one pass is laminated on the surface 61. Similarly, the tape piece 7 for the next one pass is laminated adjacent to the side of the laminated tape piece 7. By such work, the first sheet layer W11 formed by arranging the plurality of tape pieces 7 in parallel is laminated on the surface 61. A plurality of tape rolls 70 and a plurality of attaching rollers 26 may be arranged in parallel to simultaneously attach a plurality of tape pieces 7 to the surface 61. Similarly, the second sheet layer W12 and the third sheet layer W13 laminated on the first sheet layer W1 can also be formed by parallel arrangement of the tape pieces 7.

Here, whether or not the sheet layers W11, W12, and W13 are laminated as specified is crucial for maintaining the quality of the workpiece W. In particular, as illustrated in FIG. 3, in a case where one sheet layer is formed by arranging a plurality of tape pieces 7 in parallel, an overlap, a gap, and the like between the tape pieces 7 may occur. Therefore, it is necessary to inspect a laminated state of the sheet layer every time the sheet layer W11, W12, W13 is laminated, and when a defect is detected in a sheet layer, it is necessary to modify the sheet layer.

Figure 4:
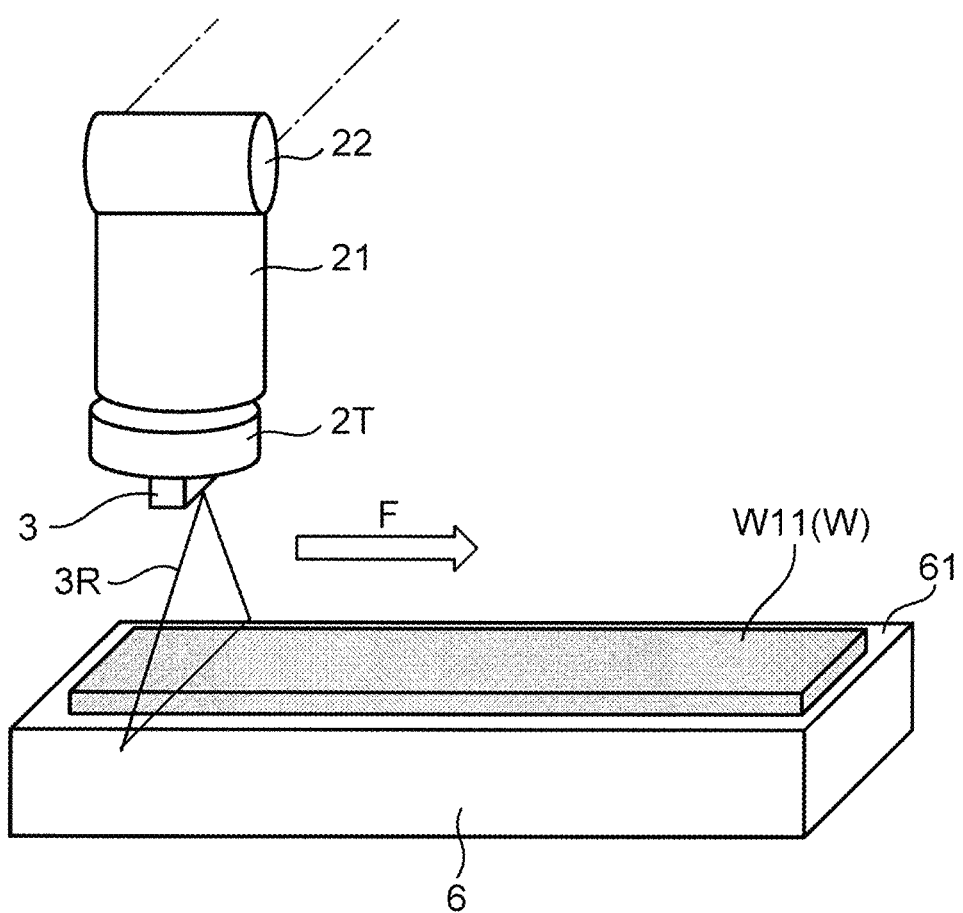
FIG. 4 is a schematic view illustrating a mode of scanning with laser slit light for shape recognition of a sheet layer.

FIG. 4 is a view illustrating a state in which shape recognition operation for the first sheet layer W11 and the mold 6 is performed for the inspection of the first sheet layer W11 (workpiece W). The laser slit light 3R is emitted from the laser sensor 3 attached to the robot distal end 2T which is the distal end of the robot arm 21. The laser slit light 3R is radiated over the entire width of the first sheet layer W11. The robot control unit 51 moves the robot distal end 2T in a scanning direction F in FIG. 4. Accordingly, the laser sensor 3 also moves in the scanning direction F, and the first sheet layer W11 is scanned with the laser slit light 3R. At the time of this scanning, a two-dimensional shape of the first sheet layer W11 is measured at a predetermined pitch by a light cutting method. Then, a three-dimensional shape of the first sheet layer W11 is obtained by connecting the acquired plurality of pieces of two-dimensional shape data.

Conventionally, a laminated state of a sheet layer has been evaluated only on the basis of three-dimensional shape data of the sheet layer. For example, in a case of inspecting the first sheet layer W11, evaluation has been performed on the basis of only a recognition result of a three-dimensional shape of the mold 6 on which the first sheet layer W1 is laminated, the three-dimensional shape being acquired by the method illustrated in FIG. 4. In this case, highly accurate recognition of a three-dimensional shape is required in order to detect minute irregularities or the like. Therefore, it is necessary to use a laser sensor having a high resolution as the laser sensor 3.

In general, a high-resolution laser sensor 3 is extremely expensive, and application of the laser sensor 3 causes an increase in cost of the inspection device 1. In addition, an inspection width by the laser slit light 3R tends to be narrowed as a higher resolution is demanded. For this reason, as illustrated in FIG. 4, a high-resolution laser sensor 3 having an inspection width which enables the entire width of the first sheet layer W11 to be inspected in one scan is not actually put on the market. Therefore, a plurality of times of scanning is required in inspection of one sheet layer, resulting in causing a problem that takt time of an inspection process becomes long.

In view of such a problem, in the present embodiment, a relatively inexpensive laser sensor 3 having a wide inspection width although not having a high resolution is used. For example, the laser sensor 3 is used which has a resolution of about 0.04 mm to 1.6 mm, preferably about 0.1 mm to 1.2 mm, and an inspection width by the laser slit light 3R of about 50 mm to 200 mm, preferably about 80 mm to 160 mm. Then, there is provided an inspection method enabling a laminated state of a sheet layer to be accurately evaluated while using such a laser sensor 3.

[Shape Recognition on the Basis of Difference]

Figure 5A:
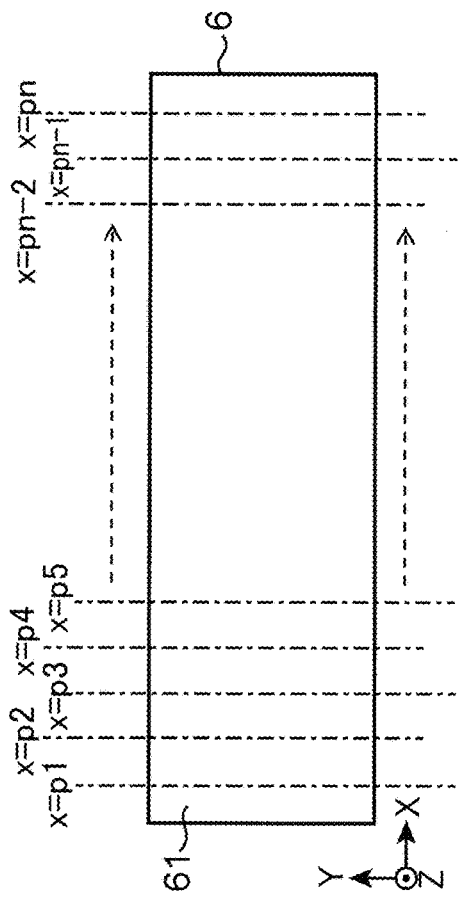
FIGS. 5A and 5B are schematic diagrams illustrating association between a two-dimensional shape detected by the laser slit light and a position data of a laser sensor.

In the present embodiment, a three-dimensional shape of a sheet layer is derived and evaluated by obtaining a difference between three-dimensional shape data before and after lamination of the sheet layer. This method will be described with reference to FIGS. 5 and 6. FIG. 5A is a diagram illustrating the state of FIG. 2A, i.e., a mode of measuring a three-dimensional shape of the mold 6 (first inspection object) before the first sheet layer W11 is laminated. The surface 61 of the mold 6 is irradiated with the laser slit light 3R from the laser sensor 3. When a long side direction of the mold is defined as the X direction, the robot control unit 51 (FIG. 1) of the controller 5 controls the articulated robot 2A so that the laser slit light 3R moves in the X direction and scans the surface 61.

The sensor control unit 52 causes the laser sensor 3 to measure two-dimensional shape data of the surface 61 of the mold 6 at measurement points X=p1, p2, p3, p4, p5 . . . p (n−2), p (n−1), and pn in the X direction. Each measurement pitch between p1 and pn is, for example, 0.1 mm. The first recognition unit 54 obtains three-dimensional shape data (referred to as "first three-dimensional shape data") of the surface 61 of the mold 6 by associating the measurement points p1 to pn acquired by the laser sensor 3 with the position data of the laser sensor 3 at the measurement points p1 to pn, respectively. As the position data of the laser sensor 3, position control data of the robot distal end 2T obtained by the robot control unit 51 can be used.

Figure 5B:
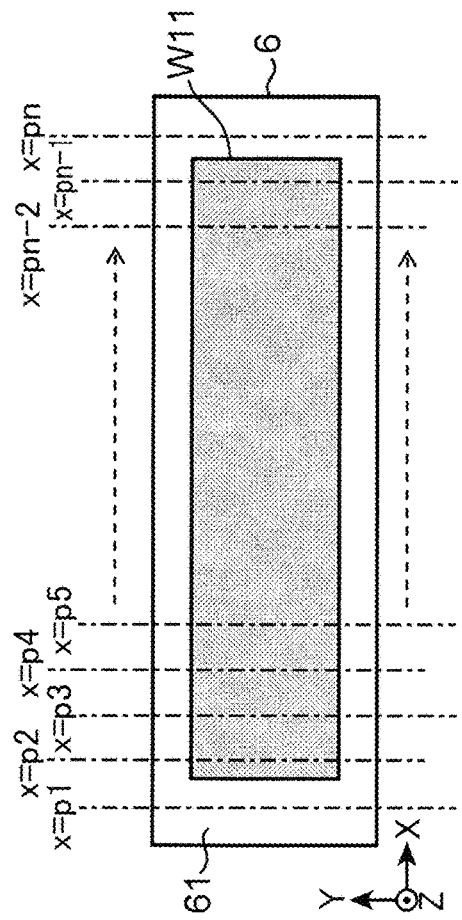

FIG. 5B is a diagram illustrating the state of FIG. 2B, i.e., a mode of measuring a three-dimensional shape of a formed product (second inspection object) in which the first sheet layer W11 has been laminated on the surface 61 of the mold 6. After the first sheet layer W11 is laminated, three-dimensional shape data is obtained by the same procedure as described above. Specifically, the robot control unit 51 controls the articulated robot 2A to scan the formed product with the laser slit light 3R. The sensor control unit 52 causes the laser sensor 3 to measure two-dimensional shape data of the mold 6 including the first sheet layer W11 at each of the measurement points X=p1 to pn in the X direction. Then, the first recognition unit 54 obtains three-dimensional shape data (referred to as "second three-dimensional shape data") of the mold 6 including the first sheet layer W11 by associating the measurement points p1 to pn acquired by the laser sensor 3 with the position data of the laser sensor 3 at the measurement points p1 to pn, respectively.

When the first three-dimensional shape data and the second three-dimensional shape data are acquired by the first recognition unit 54, the second recognition unit 55 performs processing of obtaining a difference between the two pieces of three-dimensional shape data. FIG. 6A schematically illustrates the processing performed by the second recognition unit 55 on the first sheet layer (first sheet layer W11).

Shape data (1) on the left side indicates first three-dimensional shape data D11 at the measurement point X=p2. In other words, the data is the shape data of the mold 6 at the position of X=p2 before the first sheet layer W11 is laminated.

On the other hand, shape data (2) indicates second three-dimensional shape data D12 at the measurement point X=p2. Specifically, the data is the shape data at the position of X=p2 of the formed product in which the first sheet layer W11 has been laminated using the mold 6 as the base substrate. The second three-dimensional shape data D12 includes a shaped portion DA protruding upward from the first three-dimensional shape data DI by an amount of lamination of the first sheet layer W11.

Accordingly, the difference between the shape data (1) and the shape data (2) serves as evaluation data of the first sheet layer W11. In other words, when the difference is obtained, the protruding shaped portion DA in the second three-dimensional shape data D12 remains without being canceled. This shaped portion DA forms a three-dimensional shape of the first sheet layer W11 laminated on the mold 6. The determination unit 56 evaluates the three-dimensional shape of the first sheet layer W11 on the basis of the three-dimensional shape derived by the second recognition unit 55. In other words, with the first three-dimensional shape data D11 as a reference, whether or not the thickness has increased as designed by an amount corresponding to the thickness of the first sheet layer W11 is evaluated on the basis of the second three-dimensional shape data D12.

FIG. 6B schematically illustrates difference processing performed by the second recognition unit 55 on the second sheet layer (second sheet layer W12). In the lamination of the second sheet layer, a formed product in which a basic sheet layer including a laminated body of the first sheet layer W11 is formed on the mold 6 serves as a base substrate (first inspection object). Therefore, in the second layer, the shape data (2) obtained by the previous measurement serves as first three-dimensional shape data D21.

Shape data (3) is three-dimensional shape data at the measurement point X=p2 after the second sheet layer W12 is further laminated on the first sheet layer W11 of the basic sheet. The three-dimensional shape data serves as second three-dimensional shape data D22 in the second layer. The second three-dimensional shape data D22 includes a shaped portion DB protruding upward from the first three-dimensional shape data D21 by an amount of further lamination of the second sheet layer W12. Then, a difference between the shape data (2) and the shape data (3) serves as evaluation data of the second sheet layer W12. In other words, when the difference is obtained, the protruding shaped portion DB in the second three-dimensional shape data D22 remains without being canceled. The shaped portion DB forms a three-dimensional shape of the second sheet layer W12. On the basis of the three-dimensional shape, the determination unit 56 evaluates a three-dimensional shape of the second sheet layer W12. Hereinafter, the same applies to third, fourth . . . sheet layers.

Determination processing in the determination unit 56 is relatively simple. When a thickness of one sheet layer is known, it can be evaluated that a sheet layer to be evaluated is not formed at a portion where the thickness of one layer does not appear in a three-dimensional shape of the sheet layer, the three-dimensional shape being obtained on the basis of the difference. For example, it is assumed that a portion where a thickness corresponding to the thickness of the second sheet layer W12 does not appear is detected in three-dimensional shape evaluation data of the second sheet layer W12. It can be found that the second sheet layer W12 is not formed as specified due to, for example, missing of the tape piece 7 (FIG. 3), a gap between the tape pieces 7, and the like. When there is a portion where a thickness of two or more layers appears, it can be evaluated that the sheet layers are excessively laminated due to overlapping of the tape pieces 7 or the like.

As described above, adopting the evaluation method based on a difference between before and after lamination of the sheet layer means that the laser sensor 3 having a relatively low resolution is sufficient. Specifically, as long as the laser sensor 3 has a resolution enabling determination of a thickness of one sheet layer (tape piece 7) to be laminated, it is possible to find missing or overlapping of the tape piece 7. For example, if a thickness of one sheet layer is 0.2 mm, the laser sensor 3 having a resolution on the order of 0.1 mm can be used. Since the laser sensor 3 having such a degree of resolution is put on the market as a relatively inexpensive general-purpose laser sensor, the cost of the manning device S can be reduced. Assuming that the thickness of one sheet layer is T, a resolution R of the laser sensor 3 can be selected from the range of R=0.8T to 0.2T, preferably 0.3T to 0.6T from the viewpoint of enabling presence identification of the sheet layer and not requiring excessive resolution.

In the examples illustrated in FIGS. 5A and 5B, there is shown an example in which both the first three-dimensional shape data and the second three-dimensional shape data are obtained by actual measurement. Specifically, there is illustrated an example in which the mold 6 and the first sheet layer W11 are actually scanned by the laser sensor 3, and the first recognition unit 54 obtains each three-dimensional shape data. According to this method, since both the first three-dimensional shape data and the second three-dimensional shape data are acquired by actual measurement, the second recognition unit 55 can obtain a difference between both pieces of the data according to an actual laminated state.

Alternatively, for one of the first and second three-dimensional shape data, not an actual measurement value but shape data set in advance as a design value may be used. For example, when a three-dimensional shape of the mold 6 is known, the three-dimensional shape data is stored in the data server 12 (FIG. 1) in advance. Then, programming may be prepared so that the three-dimensional shape data is read from the data server 12 as the first three-dimensional shape data when the second recognition unit 55 performs the processing of obtaining a difference. Alternatively, when a three-dimensional shape of the first sheet layer W11 is known, the three-dimensional shape data is stored in the data server 12 in advance. Then, while the first three-dimensional shape data is acquired by actually measuring the three-dimensional shape of the mold 6, the three-dimensional shape data of the first sheet layer W11 may be read from the data server 12 as the second three-dimensional shape data. According to this method, acquiring one of the first three-dimensional shape data and the second three-dimensional shape data from the data server 12 brings an advantage that the scan time by the scanning device S can be shortened.

[Case of Sheet Layer Extending Across Plurality of Surfaces]

Figure 7A:
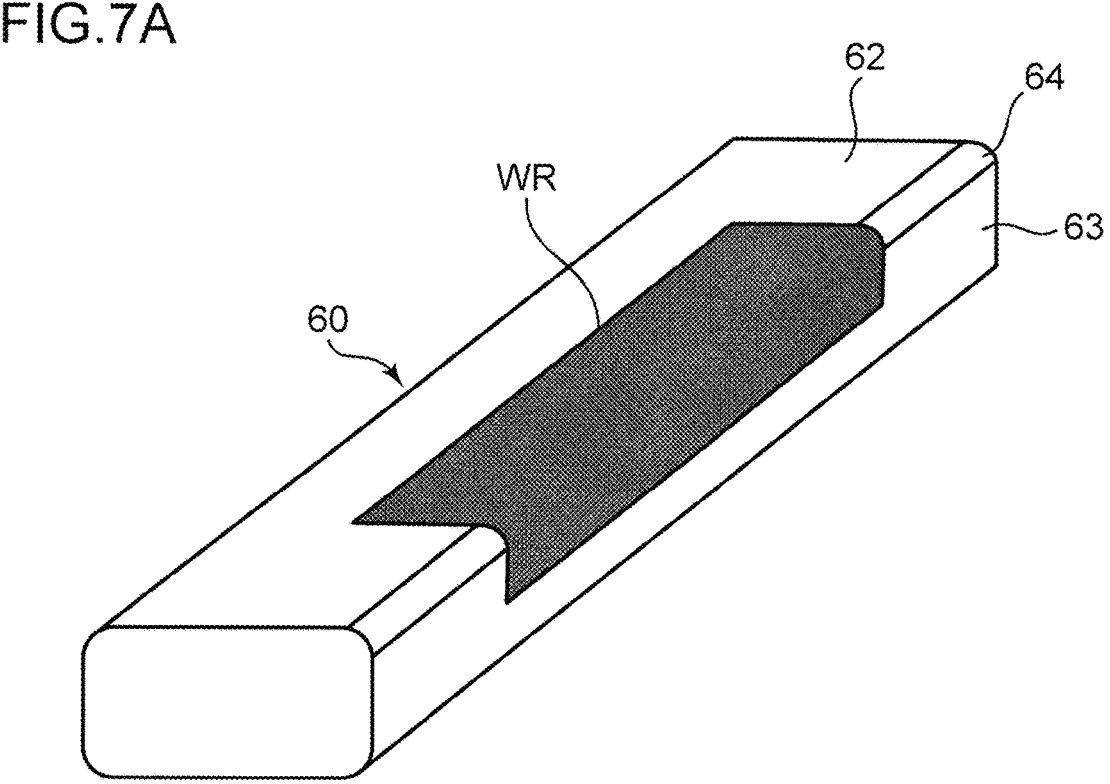
FIG. 7A is a perspective view illustrating an example in which a sheet layer is provided across a plurality of surfaces.

In the examples illustrated in FIGS. 5A and 5B, there is shown the example in which the first sheet layer W11 is formed only on one surface 61 of the mold 6. The sheet layer may be formed across a plurality of flat surfaces and curved surfaces. FIG. 7A is a perspective view illustrating an example in which a sheet layer WR is provided across a plurality of surfaces of the mold 60. The mold 60 includes a first surface 62, a second surface 63 (second surface having a different plane direction) orthogonal to the first surface 62, and a curved surface portion 64 located therebetween. The sheet layer WR is formed across the first surface 62 to the second surface 63.

Figure 7B:
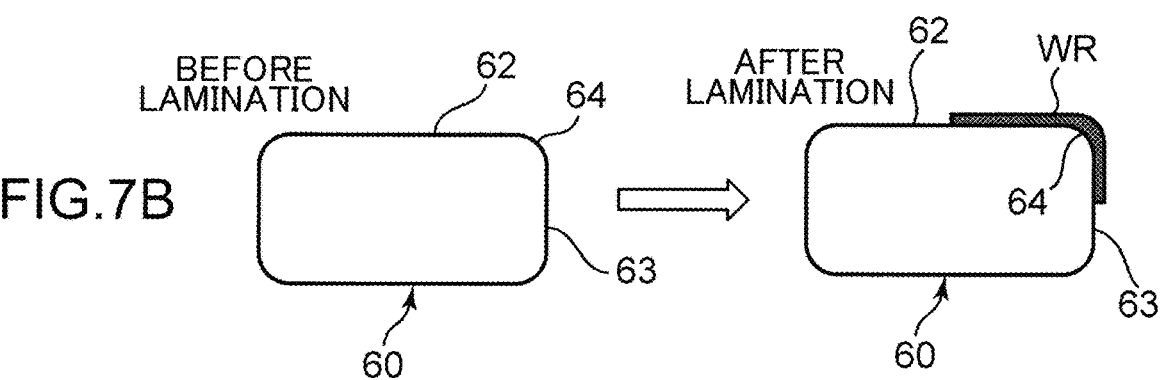
FIG. 7B is a side view thereof.

FIG. 7(B) is a side view of the mold 60 illustrating a state before the sheet layer WR is laminated and a state after the sheet layer WR is laminated. Even in such a lamination mode of the sheet layer, first three-dimensional shape data before the lamination of the sheet layer WR and second three-dimensional shape data after the lamination of the sheet layer WR are acquired similarly to the examples illustrated in FIGS. 5A and 5B. However, since not all the pieces of three-dimensional shape data of the first surface 62, the second surface 63, and the curved surface portion 64 can be acquired in one scan, each surface is scanned. At this time, the workpiece rotation control unit 53 (FIG. 1) controls the workpiece rotation mechanism 4 (drive motor 42) to rotate the mold 60 so that the mold 60 changes its posture to a posture suitable for scanning each surface.

Figures 7C, 7D, 7E:
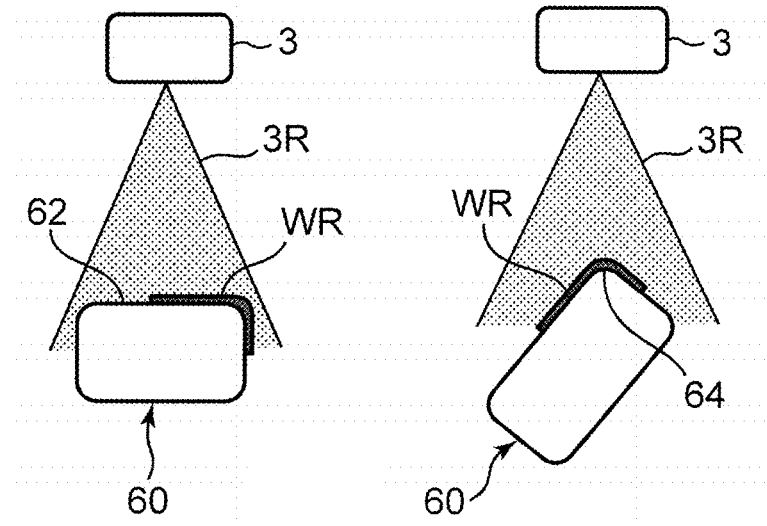
FIGS. 7C to 7E are views illustrating modes of scanning each surface.

FIGS. 7C to 7E are views illustrating modes of scanning each surface. FIG. 7C is a view illustrating a state in which the first surface 62 is scanned with the laser slit light 3R. At this time, the workpiece rotation mechanism 4 supports the mold 60 in a posture in which the first surface 62 is irradiated with the laser slit light 3R from the opposed direction. FIG. 7D illustrates a state in which the curved surface portion 64 is scanned with the laser slit light 3R. The curved surface portion 64 is a curved surface located at an intersection between the first surface 62 and the second surface 63 orthogonal to each other. Therefore, the workpiece rotation mechanism 4 rotates the mold 60 in a counterclockwise direction from the posture shown in FIG. 7C, and supports the mold 60 in a posture in which the curved surface portion 64 is irradiated with the laser slit light 3R from the opposed direction. FIG. 7E illustrates a state in which the second surface 63 is scanned with the laser slit light 3R. The workpiece rotation mechanism 4 further rotates the mold 60 in the counterclockwise direction from the posture shown in FIG. 7D, and supports the mold 60 in a posture in which the second surface 63 is irradiated with the laser slit light 3R from the opposed direction.

In this case, before the sheet layer WR is laminated, the first recognition unit 54 acquires three-dimensional shape data of the first surface 62, the second surface 63, and the curved surface portion 64 of the mold 60 by each scan, and combines them to obtain first three-dimensional shape data. Then, after the sheet layer WR is laminated, three-dimensional shape data of the first surface 62, the second surface 63, and the curved surface portion 64 of the mold 60 are acquired by each scan, and are combined to obtain second three-dimensional shape data. The second recognition unit 55 derives a three-dimensional shape of the sheet layer WR by obtaining a difference between the first three-dimensional shape data and the second three-dimensional shape data.

[Example of Defect of Sheet Layer]

As illustrated in FIG. 3, one sheet layer is formed by tightly attaching the tape pieces 7 having a predetermined width to the surface 61 of the mold 6. If end edges of adjacent tape pieces 7 are arranged without gaps and without overlapping, the sheet layer becomes a sheet layer as designed unless other problem occurs. On the other hand, when a state of attachment of the tape pieces 7 to the surface 61 is insufficient, the sheet layer becomes a sheet layer having a defect.

Examples (A) to (E) of FIG. 8 are views listing specific examples of defective taping of the tape pieces 7 to the mold 6. The example (A) of FIG. 8 illustrates defects of tape missing and a gap between tapes. The left view of the example (A) illustrates an example in which a tape missing portion M1 occurs due to a lack of attachment of the tape piece 7 for one pass due to some defect. The right view shows an example in which a gap M21 is generated between an ending edge of the tape piece 71 and a starting edge of the tape piece 72 in one pass, and an example in which a gap M22 is generated between side edges of adjacent tape pieces 7.

When the second recognition unit 55 derives a three-dimensional shape of such a defective sheet layer, the sheet layer has a three-dimensional shape in which no sheet thickness exists in parts corresponding to the tape missing portion M1, and the gaps M21 and M22. The determination unit 56 determines that there is a defect in the sheet layer on the basis of the fact that no sheet thickness is detected in a part where the sheet thickness should originally exist. In addition, the display control unit 57 urges the operator to correct the sheet layer by displaying an image of the sheet layer on the monitor 11, the image having the parts corresponding to the tape missing portion M1, the gaps M21 and M22 color-coded, and the like.

The example (B) of FIG. 8 illustrates a defective tape overlapping. An end of a tape piece 751 overlaps a linearly attached tape piece 73 to form an overlapping portion M31. An end of a tape piece 752 overlaps both of tape pieces 73 and 74 arranged in parallel to form an overlapping portion M32. Further, tape pieces 753 and 754 overlap on the tape pieces 73 and 74 in a multiple manner to form an overlapping portion M33. When a three-dimensional shape of a sheet having such a defect is derived, in the overlapping portions M31 and M32, detected at parts where the tape thickness of one layer of the tape piece 73, 74 respectively should originally exist is a tape thickness of two layers including the thickness of the tape piece 751, 752 superimposed. As for the overlapping portion M33, there are detected a portion having a tape thickness of two layers and a portion having a tape thickness of three layers.

The example (C) of FIG. 8 shows defects such as tape peeling and tape loosening. The left view of the example (C) illustrates a loosening portion M41 generated as a result of loosening of an end 7E of the tape piece 7 from the surface 61 of the mold 6. The right view shows a loosening portion M42 generated as a result of loosening of an intermediate portion of the tape piece 7 from the surface 61. A part where such loosening portion M41, M42 is generated is also detected as a portion where an excessively larger thickness is present than the original thickness of one layer of the tape piece 7 in a three-dimensional shape of a sheet layer derived by the second recognition unit 55.

The example (D) of FIG. 8 illustrates a defect of tape twisting. The left view of the example (D) illustrates a twisted portion M51 in which the tape piece 7 is twisted once, and the right view illustrates a twisted portion M52 in which the tape piece 7 is twisted twice. In the twisted portions M51 and M52, the tape piece 7 has a rising part. The example (E) of FIG. 8 illustrates a folded portion M6 generated as a result of folding-back of the end 7E of the tape piece 7. A part where such twisted portion M51, M52 or folded portion M6 is generated is also detected as a portion where an excessively larger thickness is present than the original thickness of one layer of the tape piece 7 in a three-dimensional shape of a sheet layer derived by the second recognition unit 55.

[Example of Preferred Use of Articulated Robot]

The articulated robot 2A is allowed to execute various works. While FIG. 1 illustrates the use of the articulated robot 2A as a mechanism for moving the laser sensor 3, the articulated robot may also perform work of attaching the tape piece 7 to the mold 6 (work of forming a sheet layer on a base substrate). FIG. 9 is a schematic view illustrating an example in which a taping head TH and the laser sensor 3 are mounted on the articulated robot 2A.

The articulated robot 2A is a six-axis robot including the robot arm 21 and six joint shafts J1, J2, J3, J4, J5, and J6. The articulated robot 2A is placed and fixed on the base stand 20 movable in the X direction. On the base stand 20, a tape supply 7S is mounted, the tape supply 7S housing a plurality of the tape rolls 70 which are wound bodies of the long tape 7A.

A tip fitting 25 is attached to the robot distal end 2T. The tip fitting 25 can freely move in the XYZ directions and rotate about pitch, low, and yaw axes by the operations of the six joint shafts J1 to J6. The taping head TH and the laser sensor 3 are attached to the tip fitting 25. The tape supply 7S supplies the long tape 7A to the taping head TH.

The taping head TH includes the attaching roller 26, a guide roller 27, and a tape cutter (not illustrated). The attaching roller 26 presses the long tape 7A supplied from the tape supply 7S against the surface 61 of the mold 6 while rotationally traveling in a direction of an arrow F (scanning direction F). The guide roller 27 is a pair of rollers to which a rotation driving force is applied, and feeds the long tape 7A toward the attaching roller 26. The tape cutter (not illustrated) cuts the long tape 7A into a length corresponding to a taping length of one pass from one end to the other end of the surface 61 to form one tape piece 7.

The laser sensor 3 is attached to a rear side of the attaching roller 26 in a traveling direction (the arrow F). Therefore, while performing the work of attaching the long tape 7A to the mold 6 by the attaching roller 26, it is possible to immediately inspect an attaching state of the long tape 7A. In other words, after the tape piece 7 for one pass is attached, the laminated state of the tape piece 7 can be inspected. Accordingly, an inspection time can be reduced. In addition, it is possible to immediately correct defective attachment of the tape piece 7. In this case, a laminated state of the tape piece 7 for one pass is evaluated on the basis of a difference between three-dimensional shape data of the surface 61 before attachment of the tape piece 7 and three-dimensional shape data after attachment of the tape piece 7 for one pass.

[Example of Preferred Use of Orthogonal Axis Robot]

It is difficult for the orthogonal axis robot 2B to also perform the work of attaching the tape piece 7 to the mold 6. On the other hand, in the example of the articulated robot 2A that performs inspection every time the tape piece 7 is attached, it is difficult to assume a mode in which the entire one sheet layer formed by attaching the plurality of tape pieces 7 in parallel is inspected by the laser sensor 3. By contrast, in the orthogonal axis robot 2B, since the laser sensor 3 that emits the laser slit light 3R having a large irradiation width is used, it is easy to assume a mode in which the laser sensor 3 is moved (caused to scan) after the arrangement of all the tape pieces 7 for one sheet layer is completed. An advantage of this mode is that an inclination angle of the tape piece 7 can be determined.

Figure 10A:
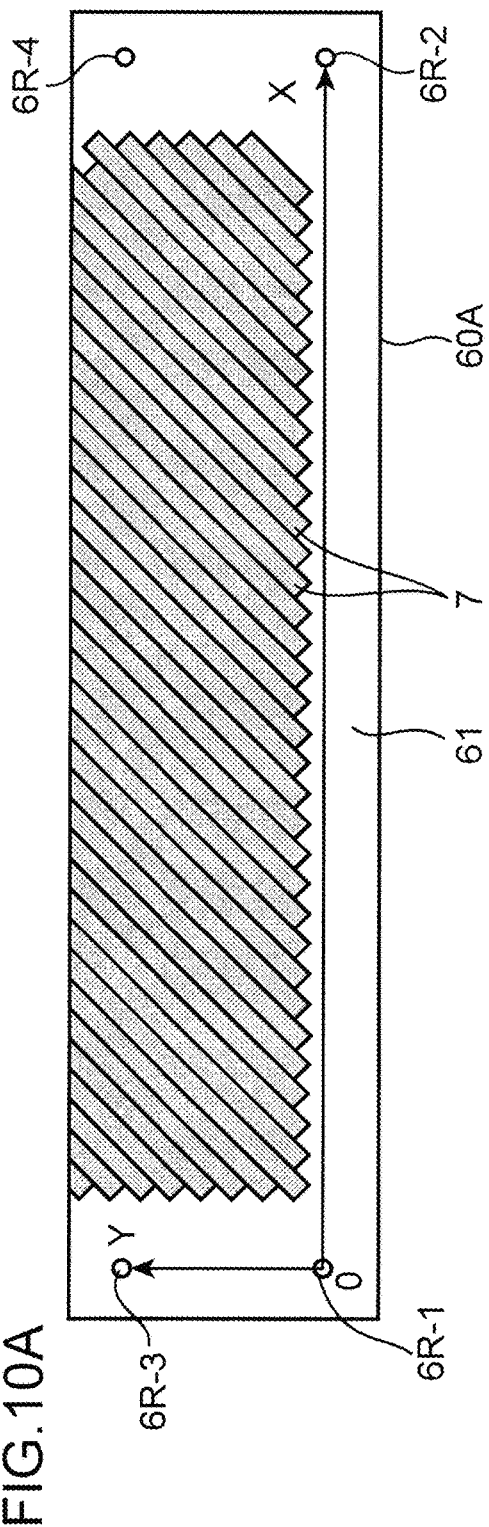
FIG. 10A is a view illustrating an example in which tapes are obliquely attached to a mold.
Figure 10B:
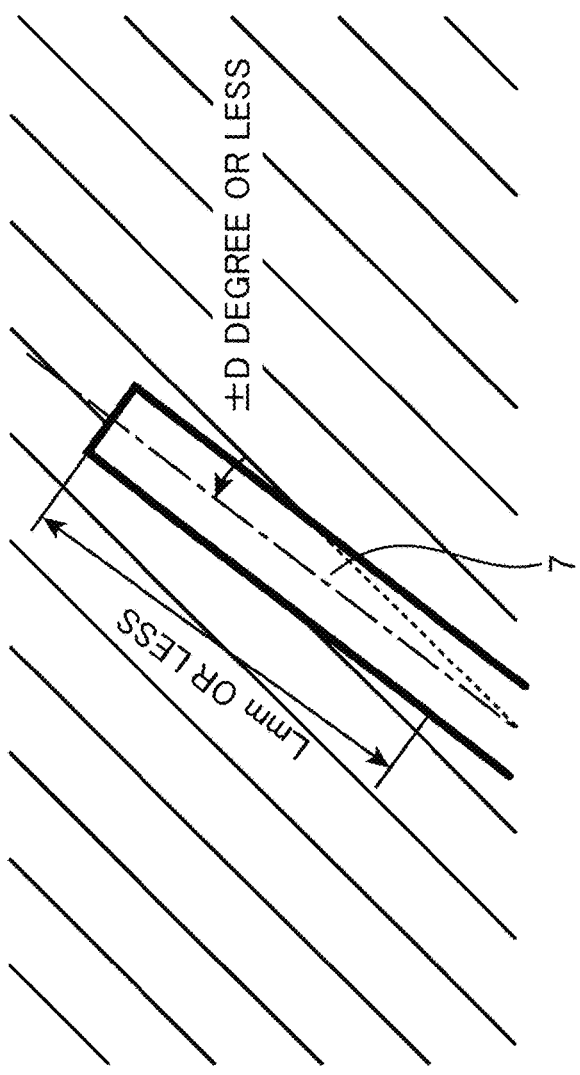
FIG. 10B is a view illustrating a defective taping angle.

FIG. 10A is a plan view illustrating an example in which the tape pieces 7 are attached obliquely to a mold 60A having a reference hole for determining XY coordinates. In a case where the tape piece 7 is made of FRP, in order to direct a fiber direction of the tape piece to an intended direction, taping may be performed with an inclination with respect to a reference XY direction of the mold 60A. When the inclination angle of the tape piece 7 deviates from a predetermined directional angle, quality of the workpiece W can be deteriorated. FIG. 10B is a view illustrating a defect of the inclination angle of the tape piece 7. When an inclination angle D degree per length L (mm) of the tape piece 7 is larger than a predetermined threshold angle, an attachment defect occurs.

The mold 60A includes four reference holes 6R-1, 6R-2, 6R-3, and 6R-4 at corner portions outside a region to which the tape piece 7 is attached on the surface 61. These reference holes 6R-1 to 6R-4 are holes whose shape can be recognized by scanning with the laser slit light 3R. For example, a straight line connecting the reference holes 6R-1 and 6R-2 serves as an X-direction reference line, and a straight line connecting the reference holes 6R-1 and 6R-3 serves as a Y-direction reference line. In other words, it is possible to cause the inspection device 1 to know the XY coordinates on the surface 61 by scanning the surface including the reference holes 6R-1 to 6R-4. Then, the inclination angle of the tape piece 7 can be evaluated on the basis of the XY coordinates.

According to the inspection device 1 (inspection method) for a sheet layer of the present embodiment described above, a three-dimensional shape of a sheet layer is evaluated on the basis of a difference between the first three-dimensional shape data and the second three-dimensional shape data, instead of depending only on three-dimensional shape data after lamination of the sheet layer. In other words, with the first three-dimensional shape data as a reference, whether or not the thickness of the sheet layer is increased as designed by the thickness corresponding to one layer is evaluated on the basis of the second three-dimensional shape data. Therefore, it is possible to use an inexpensive general-purpose laser sensor having a relatively low resolution as the laser sensor 3 of the scanning device S. Therefore, according to the inspection device 1 of the present embodiment, inspection of a laminated state of a sheet layer can be automated, and cost can be reduced.

Inventions Included in Above Embodiment

An inspection device for a sheet layer according to one aspect of the present invention is an inspection device that inspects a sheet layer laminated on a base substrate, the inspection device including: a scanning device including a laser sensor that measures a two-dimensional shape of an inspection object using laser slit light, and a movement mechanism that moves the laser sensor in a predetermined direction; a first recognition unit that obtains three-dimensional shape data of an inspection object by associating a plurality of two-dimensional shape data obtained by the laser sensor with position data of the laser sensor at the time of measuring the two-dimensional shape; and a second recognition unit that derives a three-dimensional shape of a sheet layer by obtaining a difference between first three-dimensional shape data indicating a three-dimensional shape of a first inspection object before the sheet layer is laminated on the base substrate and second three-dimensional shape data indicating a three-dimensional shape of a second inspection object after the sheet layer is laminated on the base substrate.

An inspection method for a sheet layer according to another aspect of the present invention is an inspection method for inspecting a sheet layer laminated on a base substrate, the inspection method including: moving a laser sensor that measures a two-dimensional shape of an inspection object using laser slit light so as to scan the inspection object with the laser slit light; obtaining three-dimensional shape data of an inspection object by associating a plurality of two-dimensional shape data obtained by the laser sensor with position data of the laser sensor at the time of measuring the two-dimensional shape; and deriving a three-dimensional shape of a sheet layer by obtaining a difference between first three-dimensional shape data indicating a three-dimensional shape of a first inspection object before the sheet layer is laminated on the base substrate and second three-dimensional shape data indicating a three-dimensional shape of a second inspection object after the sheet layer is formed on the base substrate.

According to the inspection device or the inspection method, a three-dimensional shape of a sheet layer is evaluated on the basis of a difference between the first three-dimensional shape data and the second three-dimensional shape data, instead of depending only on three-dimensional shape data after lamination of the sheet layer. In other words, with the first three-dimensional shape data as a reference, whether or not the thickness of the sheet layer is increased as designed by the thickness corresponding to one layer is evaluated on the basis of the second three-dimensional shape data. Then, when a thickness of the sheet layer is known, it can be evaluated that the sheet layer is not formed at a portion where the thickness of one layer does not appear in the three-dimensional shape based on the difference. In addition, a portion where the thickness of two or more layers appears can be evaluated as being excessively laminated with the sheet layers. Therefore, in the scanning device, a relatively low resolution is sufficient for the laser sensor. In other words, scanning using a relatively inexpensive general-purpose laser sensor that measures a two-dimensional shape of an inspection object using laser slit light is sufficient. Therefore, according to the above inspection device, inspection of a laminated state of a sheet layer can be automated, and cost can be reduced.

In the above-described inspection device for a sheet layer, it is desirable that the base substrate serving as the first inspection object is a laminated mold having a surface on which a sheet layer is laminated, or a formed product in which a basic sheet layer in which one or a plurality of sheet layers are laminated on the laminated mold is formed, and the second inspection object is a formed product in which a sheet layer is formed on the surface of the laminated mold, or a formed product in which a sheet layer is further formed on the basic sheet layer.

According to this inspection device, it is possible to sequentially evaluate laminated states of a sheet layer first laminated in the laminated mold and each sheet layer sequentially laminated on the sheet layer thereafter on the basis of a difference between the first three-dimensional shape data and the second three-dimensional shape data.

In the above-described inspection device for a sheet layer, it is desirable that both the first three-dimensional shape data and the second three-dimensional shape data are data obtained by actual measurement by the scanning device and the first recognition unit.

According to this inspection device, since both the first three-dimensional shape data and the second three-dimensional shape data are acquired by actual measurement, it is possible to obtain a difference between both pieces of the data according to an actual laminated state.

In the above-described inspection device for a sheet layer, it is desirable that one of the first three-dimensional shape data and the second three-dimensional shape data is shape data set in advance as a design value.

According to this inspection device, since one of the first three-dimensional shape data and the second three-dimensional shape data is acquired from the design value, scan time of the inspection object by the scanning device can be shortened.

In the above-described inspection device for a sheet layer, it is desirable that one of the sheet layers is formed by arranging a plurality of sheet pieces on the base substrate in parallel, and the movement mechanism of the scanning device moves the laser sensor after the arrangement of all of the plurality of sheet pieces is completed.

According to this inspection device, scanning operation can be simplified as compared with a case where the laser sensor is moved every time one sheet piece is arranged.

It is desirable that the above-described inspection device for a sheet layer further includes a support mechanism that supports the base substrate such that the base substrate has a changeable posture, in which the base substrate includes a first surface and a second surface having a plane direction different from a plane direction of the first surface, the sheet layer being laminated across the first surface and the second surface, and the support mechanism supports the base substrate such that the posture of the base substrate is changeable between a posture in which at least the first surface is irradiated with the laser slit light and a posture in which the second surface is irradiated with the laser slit light.

According to this inspection device, it is possible to efficiently evaluate a laminated state of a sheet layer laminated across a plurality of surfaces having different plane directions by changing the posture of the base substrate by the support mechanism.

In the above-described inspection device for a sheet layer, one of desirable modes is a mode in which the movement mechanism is an articulated robot, and the laser sensor is mounted on a robot distal end of the articulated robot.

According to this inspection device, since the laser sensor is mounted on the robot distal end of the articulated robot, an inspection object can be easily scanned with the laser slit light even if a planar shape of the sheet layer is complicated.

In this case, the articulated robot is desirably a robot that also performs work of forming the sheet layer on the base substrate.

This inspection device enables inspection of a laminated state of a sheet layer while forming the sheet layer on the base substrate.

In the above-described inspection device, one of desirable modes is a mode in which the movement mechanism is an orthogonal axis robot, and the laser sensor is mounted on a robot distal end of the orthogonal axis robot.

According to this inspection device, since the laser sensor is mounted on the robot distal end of the orthogonal axis robot, it is possible to quickly scan an inspection object with laser slit light.

According to the present invention, it is possible to provide an inspection device and an inspection method for a sheet layer which enable cost reduction to be achieved while automating inspection of a laminated state of the sheet layer.

The invention claimed is:

1. An inspection device for a sheet layer that inspects a sheet layer laminated on a base substrate, the inspection device comprising:

a scanner including a laser sensor that measures a two-dimensional shape of an inspection object using laser slit light, and a mover that moves the laser sensor in a predetermined direction;

first recognition circuitry that obtains three-dimensional shape data of an inspection object by associating a plurality of two-dimensional shape data obtained by the laser sensor with position data of the laser sensor at a time of measuring the two-dimensional shape;

second recognition circuitry that derives a three-dimensional shape of a sheet layer by obtaining a difference between first three-dimensional shape data indicating a three-dimensional shape of a first inspection object before the sheet layer is laminated on the base substrate and second three-dimensional shape data indicating a three-dimensional shape of a second inspection object after the sheet layer is laminated on the base substrate; and a support that supports the base substrate such that the base substrate has a changeable posture, wherein the base substrate includes a first surface and a second surface having a plane direction different from a plane direction of the first surface, the sheet layer being laminated across the first surface and the second surface, and the support supports the base substrate such that the posture of the base substrate is changeable between a posture in which at least the first surface is irradiated with the laser slit light and a posture in which the second surface is irradiated with the laser slit light.

2. The inspection device for a sheet layer according to claim 1, wherein:

the base substrate serving as the first inspection object is a laminated mold having a surface on which a sheet layer is laminated, or a formed product in which a basic sheet layer in which one or a plurality of sheet layers are laminated on the laminated mold is formed, and the second inspection object is a formed product in which a sheet layer is formed on the surface of the laminated mold, or a formed product in which a sheet layer is further formed on the basic sheet layer.

3. The inspection device for a sheet layer according to claim 1, wherein both the first three-dimensional shape data and the second three-dimensional shape data are data obtained by actual measurement by the scanner and the first recognition circuitry.

4. The inspection device for a sheet layer according to claim 1, wherein one of the first three-dimensional shape data and the second three-dimensional shape data is shape data set in advance as a design value.

5. The inspection device for a sheet layer according to claim 1, wherein:

one of the sheet layers is formed by arranging a plurality of sheet pieces on the base substrate in parallel, and the mover of the scanner moves the laser sensor after the arrangement of all of the plurality of sheet pieces is completed.

6. The inspection device for a sheet layer according to claim 1, wherein:

the mover is an articulated robot, and the laser sensor is mounted on a robot distal end of the articulated robot.

7. The inspection device for a sheet layer according to claim 6, wherein the articulated robot is a robot that also forms the sheet layer on the base substrate.

8. The inspection device for a sheet layer according to claim 1, wherein the mover is an orthogonal axis robot, and the laser sensor is mounted on a robot distal end of the orthogonal axis robot.

9. An inspection method for a sheet layer for inspecting a sheet layer laminated on a base substrate, the inspection method, being performed by the inspection device according to claim 1 and comprising:

moving a laser sensor that measures a two-dimensional shape of an inspection object using laser slit light so as to scan the inspection object with the laser slit light;

obtaining three-dimensional shape data of an inspection object by associating a plurality of two-dimensional shape data obtained by the laser sensor with position data of the laser sensor at a time of measuring the two-dimensional shape; and deriving a three-dimensional shape of a sheet layer by obtaining a difference between first three-dimensional shape data indicating a three-dimensional shape of a first inspection object before the sheet layer is laminated on the base substrate and second three-dimensional shape data indicating a three-dimensional shape of a second inspection object after the sheet layer is formed on the base substrate.

* * * * *